April 27, 1965     G. H. FERTIG ETAL     3,180,984
STABILIZED COMPARISON ANALYZER AND METHOD OF ANALYZING
Filed April 11, 1962     2 Sheets-Sheet 1
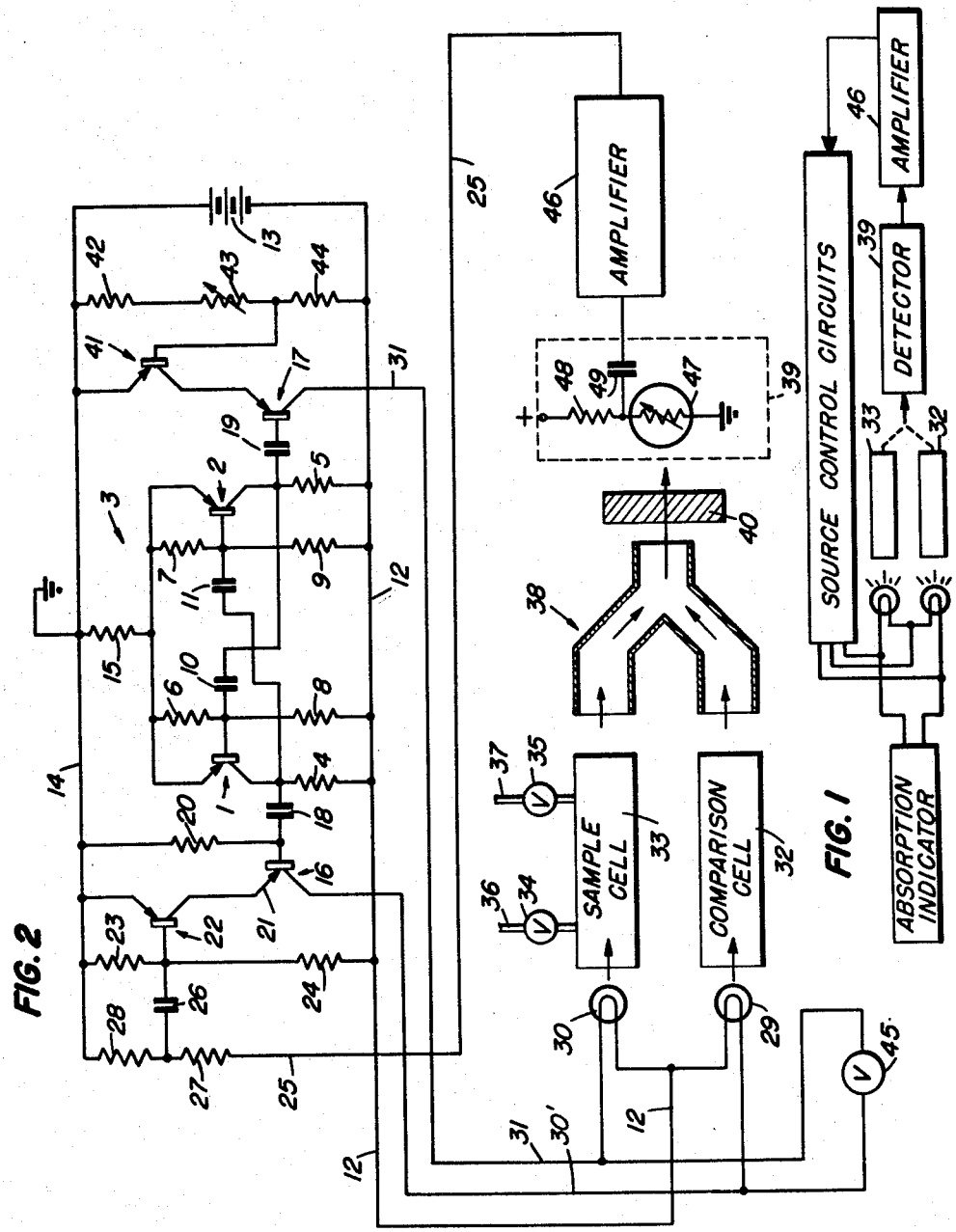
INVENTORS
Glenn H. Fertig
Adrian C. Billetdeaux
BY
ATTORNEY April 27, 1965   G. H. FERTIG ETAL   3,180,984
STABILIZED COMPARISON ANALYZER AND METHOD OF ANALYZING
Filed April 11, 1962   2 Sheets-Sheet 2

INVENTORS
Glenn H. Fertig
Adrian C. Billetdeaux
BY *Rupert J. Brady*
ATTORNEY

United States Patent Office 3,180,984
Patented Apr. 27, 1965

---

3,180,984
STABILIZED COMPARISON ANALYZER AND
METHOD OF ANALYZING
Glenn H. Fertig and Adrian C. Billetdeaux, both of Pittsburgh, Pa., assignors to Mine Safety Appliances Company, Pittsburgh, Pa., a corporation of Pennsylvania
Filed Apr. 11, 1962, Ser. No. 186,811
12 Claims. (Cl. 250—43.5)

The invention is directed to a comparison analyzer device of the optical-electronic type, for gases, vapors, and/or liquids, which is temperature stabilized and to a method of analyzing gases, vapors, and/or liquids.

One of the objects of the invention is to provide a construction of optical-electronic analyzer for gas, vapor or liquid in which the entire analyzer circuitry, energy sources and optics are stabilized.

Another object of the invention is to provide a construction of optical-electronic analyzer for gas, vapor or liquid which will continue to render accurate comparison measurements during extended periods of continuous use.

Still another object of the invention is to provide a construction of optical-electronic analyzer for gas, vapor or liquid in which the energy sources are alternately energized.

A further object of the invention is to provide a construction of optical-electronic analyzer for gas, vapor or liquid in which the concentration of gas, vapor or liquid is determined by the voltage differential across the energy sources, the current differential between the energy sources, or differential between power fed to the energy sources.

Still a further object of the invention is to provide a gas, vapor or liquid analyzer in which the intensity of one of the energy sources is controlled by feedback circuitry.

Other and further objects of the invention reside in the manner in which the energy emitting sources are controlled and in the method of analyzing gases, vapors, and/or liquids, as set forth more fully in the specification hereinafter following by reference to the accompanying drawings, in which:

FIG. 1 is a block diagram of the analyzer of the invention;

FIG. 2 is a schematic diagram showing a typical electrical circuit for carrying out the teachings of the invention, having a power oscillator source control, and showing the system for converging the light beams in vertical section;

Figure 3:
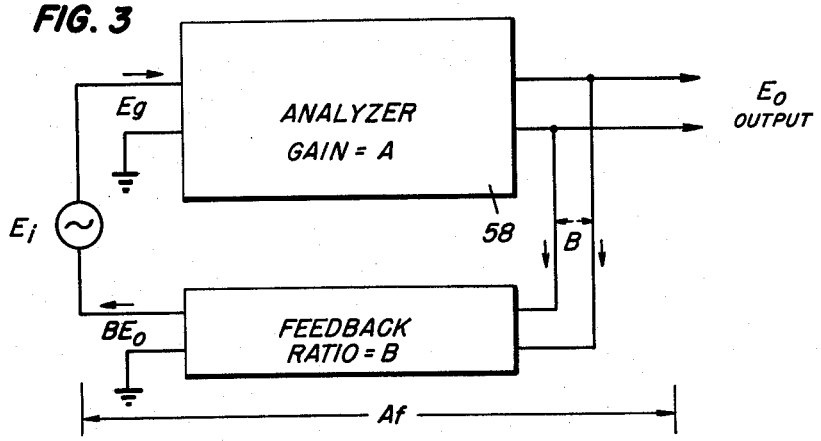
FIG. 3 is an electrical schematic block diagram teaching the operation of the feedback system in the invention.

The invention is directed to an optical analyzer for gas, vapor, and/or liquid, of the type comprising two sources of light energy, means for chopping the light energy, an optical cell containing a sample of a gas, vapor or liquid, an optical comparison cell containing a gas, vapor or liquid to be compared to that in the sample cell, a detector for detecting the light energy passing through the sample and comparison cells, an amplifier for amplifying the detector signal and a recorder for recording an indication of the controlled signal. The sources of radiant energy are small ribbons of Nichrome wires, or equivalent devices, which are heated electrically to a point where they emit radiant energy having a continuous spectrum in the visible range and infra-red range. It is to be understood that sources emitting energy in the ultra-violet range can also be utilized. The radiant energy thus produced is directed into the sample and comparison cells; after passing through the cells the alternating emanations are both converged into a detector. In the prior art a mechanical shutter, normally of the rotating disc type, has been utilized to alternately interrupt the radiant energy into or out of each cell, thereby permitting comparison of the amount of light reaching the detector through each of the cells. In lieu of a mechanical device for alternately blocking the beams, in this invention, a power oscillator circuit is utilized in the analyzer device to alternately energize the sources of the two radiant energy beams to thereby render the effect of alternately interrupting the beams. For purposes of illustration only the power oscillator circuit is shown and described as a transistorized multivibrator circuit throughout the specification but it is to be understood that other types of power oscillators are also applicable to the teachings of the invention.

Initially, the comparison analyzer may be set up so that the amount of radiant energy reaching the detector through the sample beam is equal to the amount of radiant energy reaching the detector through the comparison beam. This initial balancing of the system is accomplished with gas, vapor, or liquid in the comparison cell and with no gas, vapor or liquid in the sample cell, or with a carrier gas, vapor or liquid in the sample cell. The gas, vapor, or liquid, whose density is to be compared to the corresponding gas, vapor, or liquid in the comparison cell is then introduced into the sample cell or into the carrier gas, vapor or liquid in the sample cell. If it absorbs energy there will be an unbalance between the two emanations that alternately arrive at the detector. A measure of the amount of unbalance between the beams is the signal from the detector.

In some types of optical-electronic analyzers for gas, vapor, and/or liquid, in the prior art, a portion of the amplified signal from the detector is fed back to the detector in an attempt to stabilize the analyzer for changes in gain in the analyzer circuits due to the temperature coefficient of the various components. Change in analyzer gain causes analyzer instability and erroneous comparison readings. However, the type of feedback system used in the prior art only stabilizes the detector and amplifier portions of the analyzer circuits, and does not stabilize rising temperature effects on the sources of the radiant energy and the optics involved in the system which includes sample and comparison cells of the beam-converging device. The applicants have devised an analyzer circuit to overcome this difficulty by providing a new method of chopping the radiant energy by utilizing a power oscillator circuit, and have devised a feedback circuit which will completely stabilize both the electronic circuitry portions and the optical portion of the gas, vapor, and/or liquid analyzer.

Referring to FIG. 2, which shows a schematic diagram of the analyzer of the invention, a free-running (astable) multivibrator circuit, which is a nonsinusoidal two-stage oscillator, having transistors 1 and 2, is indicated generally at 3. This is a conventional astable multivibrator circuit symmetrically arranged with corresponding transistors 1–2, resistors 4–5, 6–7, 8–9 and condensers 10–11, having the same parameters. The base of transistor 1 is connected to the collector of transistor 2 through condenser 10 and the base of transistor 2 is connected to the collector of transistor 1 through condenser 11. Resistors 4 and 5, respectively, connect the collectors of transistors 1 and 2 to the base 12 connected with the negative side of battery 13, while the bases of the transistors 1 and 2 are connected to the buss 12 through resistors 8 and 9, respectively. The emitters of the transistors 1 and 2 are commonly connected to the ground buss 14 through resistor 15 while the bases of transistors 1 and 2 are respectively connected to the ungrounded end of resistor 15, through voltage divider resistors 6 and 7. The multivibrator operates in the conventional manner such that when transistor 1 conducts, the base of transistor 2 is driven to a positive voltage to cut off transistor 2. As condenser 10 quickly charges toward the potential on buss 12, condenser 11 is discharging toward the potential across resistor 15. When the voltage at the base of transistor 2 starts to go negative, transistor 2 will begin to conduct with the positive going waveform at its collector transferred to the base of transistor 1 through condenser 10, thus cutting off transistor 1 and driving transistor 2 into harder conduction. Transistor 1 remains in the cutoff state until condenser 10 has discharged sufficiently to enable transistor 1 to again conduct and repeat the cycle. The output square waves of the multivibrator are taken from the collectors of transistors 1 and 2 and are alternately fed to the bases of electronic valve means or transistors 16 and 17, respectively through condensers 18 and 19.

The base of transistor 16 is connected to ground through resistor 20 and the emitter 21 of transistor 16 is connected to the collector of transistor 22, the emitter of which is connected to ground while the base is connected with a voltage divider network connecting the base to ground through resistor 23 and the base to the battery power buss 12 through resistor 24. The base of transistor 22 is also connected to the amplifier feedback circuit 25 through capacitor 26 and resistor 27, the feedback circuit being connected to ground through resistor 28. The collector of transistor 16 is connected to one side of comparison radiant energy source 29 through conductor 30' while the other side of the radiant energy source is connected to the battery power buss 12. When a negative square wave is impressed upon the base of transistor 16 from the collector of multivibrator transistor 1, transistor 16 conducts, thus energizing comparison radiant energy source 29 connected in the collector circuit.

When the multivibrator reverses its action, transistor 17 is caused to conduct, thereby energizing sample radiant energy source 30 connected between power buss 12 and collector circuit 31. Thus, as the free-running multivibrator alternately drives transistors 16 and 17 into conduction, radiant energy sources 29 and 30 are respectively energized to alternately emit radiant energy at a substantially high repetition rate through their corresponding cells. As previously stated, the radiant energy sources contain small ribbons of Nichrome wire, or the like, which are electrically heated to a point where they emit radiant energy in the visible or infra-red portion of the spectrum. Radiant energy 29 is disposed to direct radiant energy through optical comparison cell 32 in which a gas, liquid, or vapor is disposed to which a sample of another gas, liquid, or vapor is to be compared with respect to relative densities. On the other hand, radiant energy source 30 is disposed to direct radiant energy through optical sample cell 33 which contains a sample of a gas, liquid or vapor whose density is to be compared to the specimen contained in comparison cell 32. The sample specimen may be emitted to and exhausted from the sample cell 33 by manipulation of valves 34 and 35, respectively, connected in sample cell input and output lines 36 and 37.

After passing through comparison cell 32 and sample cell 33, the alternating beams of radiant energy from radiant energy sources 29 and 30 are converged into a single beam of radiant energy by the V-shaped beam combiner unit 38. This beam combiner unit has a separate channel for receiving the sample beam and a separate channel for receiving the comparison beam. These separate channels are provided with highly reflective walls, such as polished stainless steel, and converge into a single output channel to direct the combined beam into a detector unit, indicated generally at 39, through an infra-red band pass filter 40. The beam combiner unit 38 may be similar to that disclosed in Patent 2,648,775, issued to J. L. Waters on August 11, 1953. The detector unit then measures the differences in intensity between that portion of the combined beam issued from the sample cell and that portion of the combined beam issued from the comparison cell.

The emitter of transistor 17, which controls sample light source 30 is connected to the collector of transistor 41, the emitter of which is connected to ground and the base of which is connected in a voltage divider network consisting of resistors 42, 43 and 44, connected across battery 13. Resistor 43 is a variable resistor controlling the conduction of transistor 41, which, in turn, controls the conduction of transistor 17 which controls the intensity of sample radiant energy source 30. In the initial setup and balancing of the analyzer circuit, a specimen is introduced in comparison cell 32, with no specimen in sample cell 33, but normally with a carrier gas, vapor, or fluid in the sample cell. The intensities of radiant energy sources 30 and 29 are balanced with respect to each other by means of adjusting variable resistor 43 to approach a balanced condition where no difference in intensity between the sample beam and the comparison beam is sensed by detector 39. An indication of this balance condition is rendered by absorption indicator 45 which is a voltmeter connected across the radiant energy source energizing circuits 30' and 31, the absorption indicator being graduated to render a direct reading of relatively radiant energy absorption between the two specimens under analysis. Thus in the initial analyzer balancing procedure, the intensity of radiant energy source 30 and the conduction of transistor 17 is varied by means of variable resistor 43. After the analyzer has been balanced, the specimen to be analyzed is then introduced into sample cell 33.

Absorption indicator 45 could also be represented by ammeters in the energizing circuits 30' and 31 where the difference in the readings of the meters would render an indication of absorption. This could also be accomplished by power meters inserted in the circuits to render an indication of the difference in power supplied to each of the sources.

A portion of the radiant energy from source 30, directed through the sample specimen in sample cell 33, is absorbed by the gas, liquid or vapor specimen, and the detector 39 senses a difference in intensity between the beam emerging from sample cell 33 and the beam emerging from comparison cell 32. The detector thus creates a difference signal which is amplified in a conventional amplifier circuit indicated at 46 and a portion of the amplified signal is fed back to the base of transistor 22 over feedback circuit 25. This feedback signal varies the output at the collector of transistor 22 and since the collector is connected to emitter 21 of transistor 16 the signal thus effects the output voltage of transistor 16 by causing a voltage reduction proportional to the amount of absorption in the sample cell 33. This voltage reduction in the output of transistor 16 thus reduces the voltage across comparison radiant energy source 29. The absorption indicator 45 will thus render a reading proportional to the radiant energy absorption of the gas, liquid or vapor sample being analyzed in sample cell 33 to give an indication of relative density.

Figure 5:
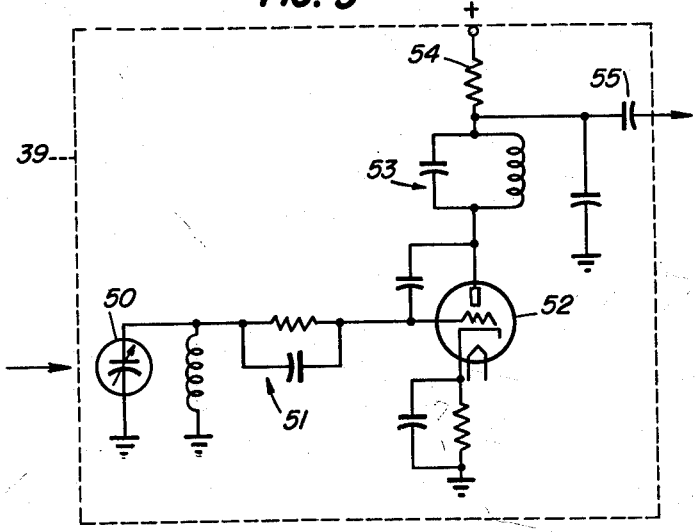
FIG. 5 is an electrical schematic diagram showing a modified form of the detector circuit for the analyzer of the invention.

The analyzer circuit of the invention can be used in either the visible, infra-red, or ultra-violet portions of the spectrum; therefore, in FIG. 2, we have shown a detector circuit for use with the visible or near infra-red portions of the spectrum, while in FIG. 5 we have shown a modified form of detector 39 for use in the infra-red portion of the spectrum. It is also to be understood that other types of detectors can be utilized, the choice of detector being determined in part by the type of light-emitting energy source utilized in the analyzer circuit.

The detector 39 of FIG. 2 comprises a photoconductive detector cell 47 connected in series with a resistance 48 intermediate ground and a source of potential. When the combined light beam from the beam combiner unit 38 strikes the detector 47, the internal resistance of the detector drops, and the voltage across the detector coil 47 decreases. If the intensity in the combined light beam fluctuates, a fluctuating voltage will be produced by the detector cell and this fluctuating voltage output produced by the detector is coupled by means of capacitor 49 to a conventional A.C. amplifier 46.

We have shown a pneumatic type of radiant energy intensity detector in FIG. 5 which is operated by radiant energy in the infra-red portion of the spectrum. The pneumatic detector indicated at 50 is connected, as shown, into the tuned grid circuit indicated generally at 51 of the oscillator tube 52. The tuned plate circuit of the oscillator 52 is connected to a source of potential through tank circuit 53 and resistor 54, with the output of the tuned plate, tuned grid oscillator circuit being taken intermediate tank circuit 53 and resistor 54 so that a portion of the detected signal is coupled to a conventional A.C. amplifier by means of condenser 55. When infra-red energy is received by pneumatic detector 50 there is a temperature and pressure increase of the gas within the detector cell. The increased pressure moves a sensitive membrane within the unit causing a change in capacitance effecting the balance of the tuned grid circuit, thereby causing a change in the output of the plate circuit. Thus, this movement is converted into an A.C. signal by the self-detecting tuned plate, tuned grid oscillator circuit, and a fluctuation in the infra-red energy received by the pneumatic detector unit 50 will cause a fluctuation of the output plate voltage which is capacitor-coupled to amplifier 46.

Figure 4:
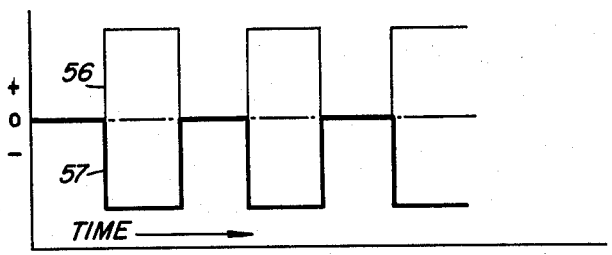
FIG. 4 is a graph showing the phase relation between the multivibrator outputs and the detector feedback signal.

As previously stated, a portion of the amplified difference signal, detected by the detector, which is a positive square wave, as indicated by waveform 56 in the graph of FIG. 4, is fed back to the base of transistor 22 by means of feedback circuit 25. The amount of feedback depends upon the amplitude of the square waves produced by the detector, and the positive square waves on the base of transistor 22 must be in phase with the negative square waves on the base of transistor 16, as indicated in the graph of FIG. 4, wherein the negative square wave on the base of transistor 16 is indicated at 57. Transistor 22 performs as an electronic valve which controls the amount of current that can flow through transistor 16 and radiant energy source 29 and the feedback circuit operates to control the conduction of transistor 22. The feedback control system can best be understood by reference to the block diagram of FIG. 3, wherein the main analyzer circuit is shown generally by the block indicated at 58. The analyzer system has a voltage gain denoted by the symbol A which produces an output voltage Eo. An alternating signal (multivibrator output), Ei, is fed into the input of the system. A signal B from the system output is fed back through a feedback network to the input of the system as a feedback voltage, BEo. When B is negative, the feedback voltage is negative. This ties in with the fact that when negative feedback is used, the output from the amplifier is less than the output when there is no feedback used. Consequently, to be negative, the feedback voltage must always be 180° out of phase from the incoming signal.

At the point in the system where the signal is fed back, the feedback voltage and the input signal are added together algebraically to produce the total effective input voltage to the system. This algebraic summation is accomplished at transistors 22 and 16. When the feedback is negative, the feedback voltage opposes the signal voltage, so the net total system input voltage is equal to the algebraic difference between the signal and the feedback voltage. This is illustrated in FIG. 3. The system is assumed to have gain A without feedback. The feedback network takes a fraction of the output voltage Eo and transfers it to the input circuit. The fraction of the signal fed back is B and it is only a fraction of the signal detected by the detector cell since it is taken from a voltage divider network, such as intermediate resistors 27 and 28.

$$B\frac{Efb}{Eo} \qquad (1)$$

From this it can be seen the voltage Efb fed back to the input is $$Efb = BEo \qquad (2)$$

We normally use the input voltage where feedback is introduced as a reference point. In this case Eo may be either positive or negative. For example, if there is 180° of phase shift introduced in the system, Eo then has a negative value. If there is 360° of phase shift in the system, Eo has a positive value.

If Eo is negative, a fraction of it can be tapped off directly and fed back to the input of the system for negative feedback. In this case B is positive because it has not changed feedback phase. If Eo is positive it must undergo a 180° phase shift before it is applied to the input. This inversion takes place in the feedback network where B is negative.

From the foregoing we can see for negative feedback, either Eo or B must be negative.

We have defined the basic factors well enough to set the fundamental realtions in FIG. 2. We call the signal voltage Ei and the total signal into the system with feedback Eg. The feedback signal BEo is applied to the input so as to add to the signal voltage Ei algebraically to provide input signal Eg.

Expressed mathematically:

$$Eg = (Ei) + (BEo) \qquad (3)$$

Because without feedback the amplification of the system is A:

$$Eo = AEg \qquad (4)$$

Substituting Equation 3 in Equation 4:

$$Eo = (AEi) + (ABEo) \qquad (3)$$

and $$Eo(1 - AB) = AEi \qquad (4)$$

Therefore, $$\frac{Eo}{Ei} = \frac{A}{1 - AB} \qquad (5)$$

The ratio of Eo/Ei is the amplification of the system with feedback applied, which will be designated Af.

$$Af = \frac{A}{1-AB} \text{ and } \frac{Af}{A} = \frac{1}{1-AB} \qquad (6)$$

This then shows how the feedback system in the circuit of the invention will control the overall stability of the analyzer, since it functions to stabilize the system from effects of temperature change on the electronic circuit components, the light sources and the optics.

While the invention has been described in certain of its preferred embodiments we realize that modifications can be made, and we desire that it be understood that no limitations upon the invention are intended other than those imposed by the scope of the appended claims.

What we desire to secure by Letters Patent of the United States, is as follows:

1. The method of comparing the relative densities of fluids, comprising:
    (1) intermittently directing radiant energy from a first source through a corresponding fluid specimen;
    (2) alternately directing radiant energy from a second source through another corresponding fluid specimen;
    (3) synchronously alternately energizing and deenergizing said first and second sources;
    (4) detecting variation in intensity between the radiant energy emerging from each specimen;
    (5) reducing the intensity of one of the sources thereby reducing the radiant energy directed through one of the specimens to approach a balance of intensities between the radiant energy emerging from each specimen; and (6) obtaining a measurement at the sources based on the relative difference in intensity between the radiant energy emitting sources directing radiant energy to the respective specimens to obtain an indication of relative densities between the two specimens.

2. The method of comparing the relative densities of gases comprising:

(1) intermittently directing radiant energy from a first source through a corresponding gas specimen;

(2) alternately directing radiant energy from a second source through another corresponding gas specimen;

(3) synchronously alternately energizing and deenergizing said first and second sources;

(4) detecting variations in intensity between the radiant energy emerging from each specimen;

(5) varying the intensity of one of the sources thereby varying the radiant radiant energy directed through one of the specimens to approach a balance of intensities between the radiant energy emerging from each specimen; and (6) obtaining a measurement based on the relative difference in intensity between the radiant energy emitting sources to obtain an indication of relative densities between the two specimens.

3. The method of determining the relative light energy absorption properties of gases comprising:

(1) intermittently directing radiant energy from a first source;

(2) alternately directing radiant energy from a second source through a first gas specimen;

(3) detecting variation in intensity between the radiant energy from the first source and the radiant energy from the second source emerging from the first specimen;

(4) varying the energization of the first source to vary the intensity of the radiant energy from the first source to approach a balance of detected intensities;

(5) directing the radiant energy from the first source through a second gas specimen;

(6) detecting variations in intensity between the radiant energy emerging from each of the specimens;

(7) varying the energization of the second source to vary the intensity of the radiant energy emitting from the second source to the first gas specimen to approach a balance in intensities between the radiant energy emerging from each specimen; and (8) obtaining a measurement at the sources based on the relative difference in intensity between the radiant energy emitting sources to obtain an indication of relative densities between the two specimens.

4. The method of determining the relative light energy absorption properties of fluids comprising:

(1) intermittently directing radiant energy from a first source;

(2) alternately directing radiant energy from a second source through a first fluid specimen;

(3) detecting variation in intensity between the radiant energy from the first source and the radiant energy from the second source emerging from the first specimen;

(4) varying the energization of the first source to vary the intensity of the radiant energy from the first source to approach a balance of detected intensities;

(5) directing the radiant energy from the first source through a second fluid specimen;

(6) detecting variations in intensity between the radiant energy emerging from each of the specimens;

(7) varying the energization of the second source to vary the intensity of the radiant energy emitting from the second source to the first specimen to approach a balance in intensities between the radiant energy emerging from each specimen; and (8) obtaining a measurement at the sources based on the relative difference in intensity between the radiant energy emitting sources to obtain an indication of relative densities between the two specimens.

5. The method of comparison analysis of fluids comprising:

(1) directing a first beam from a radiant energy emitting source through a standard fluid;

(2) directing another beam from a second radiant energy emitting source through a fluid to be compared to the standard;

(3) alternately electrically energizing and deenergizing the first and second sources of the radiant energy beams;

(4) converging the radiant energy beams into a single beam;

(5) detecting variations in intensity in the converged beam as the first and second sources are alternately energized and deenergized;

(6) varying the intensity of the first radiant energy emitting source associated with the standard fluid thereby varying the intensity of the beam directed therethrough, by varying the voltage to the source, with the variations detected in step (5), to approach a balance in intensities in the converged beam; and (7) obtaining a measurement at the sources based on the relative difference in intensity between the radiant energy emitting sources to obtain an indication of relative densities between the two specimens.

6. The method of comparison analysis of gases comprising:

(1) directing a beam from a radiant energy emitting source through a standard gas;

(2) directing another beam from a radiant energy emitting source through a gas to be compared to the standard;

(3) alternately energizing and extinguishing the sources of the radiant energy beams;

(4) converging the radiant energy beams to impinge on a common detector;

(5) detecting variations in intensity in the converged beams;

(6) varying the intensity of the radiant energy emitting source associated with the standard gas thereby varying the intensity of the beam directed therethrough, by varying the voltage to the source of that beam, with the variations detected in step (5), to approach a balance in intensities in the converged beams; and (7) obtaining a measurement at the sources based on the relative difference in intensity between the radiant energy emitting sources to obtain an indication of relative densities between the two specimens.

7. Comparison analysis apparatus of the type for measuring relative densities of fluids and gases comprising, sample radiant energy emitting means, separate comparison radiant energy emitting means, a source of electrical power connected with said sample and comparison radiant energy emitting means, electric oscillator means connected with said electrical power source and having alternately operable outputs, electronic valve means connecting one of said oscillator outputs with said comparison radiant energy emitting means for alternately supplying energizing electrical power thereto, means connecting the other of said oscillator outputs to said sample radiant energy emitting means for alternately supplying energizing electrical power thereto, radiant energy responsive means disposed to receive radiant energy alternately from said sample radiant energy emitting means through a sample specimen and from said comparison radiant energy emitting means through a comparison specimen and provide an intensity difference signal, and feedback circuit means connecting said radiant energy responsive means and said electronic valve means for controlling the output thereof and varying the intensity of said comparison radiant energy emitting means and the radiant energy to the comparison specimen with the intensity difference signal, to reduce the difference of the radiant energy intensities incident upon said radiant energy responsive means from said radiant energy emitting sources through the specimens.

8. Comparison analysis apparatus of the type for measuring relative densities of fluids and gases comprising, sample radiant energy emitting means, separate comparison radiant energy emitting means, a source of electrical power connected with said sample and comparison radiant energy emitting means, electronic oscillator means connected with said electrical power source and having alternately operable outputs connected to said radiant energy emitting means to alternately energize and deenergize the latter, radiant energy responsive means disposed to receive radiant energy alternately from said sample radiant energy emitting means through a sample specimen and from said comparison radiant energy emitting means through a comparison specimen and provide an intensity difference signal, and feedback circuit means connecting said radiant energy responsive means to one of the electronic oscillator outputs for varying the power to and the intensity of said comparison radiant energy emitting means and the radiant energy to the comparison specimen with the intensity difference signal, to reduce the difference of the radiant energy intensities incident upon said radiant energy responsive means from said radiant energy emitting sources through the specimens.

9. Comparison analysis apparatus as set forth in claim 8, in which said electronic oscillator means is a multivibrator.

10. Comparison analysis apparatus at set forth in claim 8 in which said electronic oscillator means is an astable multivibrator.

11. Comparison analysis apparatus as set forth in claim 8, including radiant energy converging means disposed adjacent said radiant energy responsive means for converging the energy from said sample radiant energy emitting means through a sample specimen and the energy from said comparison radiant energy emitting means through a comparison specimen into a single incident radiant energy beam for said radiant energy responsive means.

12. Comparison analysis apparatus as set forth in claim 8, including indicator means connected into the circuits of said sample radiant energy emitting means and said comparison radiant energy emitting means for measuring the difference in power supplied thereto and rendering an indication of relative density of the sample specimen with respect to the comparison specimen.

References Cited by the Examiner

UNITED STATES PATENTS

| 1,878,891 | 9/32 | Robinson | 250—83.3 |
| 2,904,686 | 9/59 | Sebens | 250—43.5 |
| 2,904,687 | 9/59 | Sobcov et al. | 250—43.5 |
| 2,924,713 | 2/60 | Liston | 250—43.5 |
| 2,925,007 | 2/60 | Silver | 250—218 X |
| 2,999,929 | 9/61 | Martin et al. | 250—43.5 |
| 3,004,664 | 10/61 | Dreyfus | 250—43.5 X |
| 3,013,153 | 12/61 | Fisher et al. | 250—43.5 |
| 3,022,422 | 2/62 | Grove-White | 250—43.5 |

RALPH G. NILSON, *Primary Examiner.*